US007936698B1

(12) United States Patent
Sarkar et al.

(10) Patent No.: US 7,936,698 B1
(45) Date of Patent: May 3, 2011

(54) SYSTEM AND METHOD FOR REDUCING REVERSE NOISE RISE IN WIRELESS COMMUNICATIONS

(75) Inventors: Debasish Sarkar, Guragon (IN); Sachin R. Vargantwar, Overland Park, KS (US); Manoj J. Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 144 days.

(21) Appl. No.: 12/119,528

(22) Filed: May 13, 2008

(51) Int. Cl.
*G01R 31/08* (2006.01)
*G06F 11/00* (2006.01)
*G08C 15/00* (2006.01)

(52) U.S. Cl. ..................................... 370/252
(58) Field of Classification Search .............. 370/252, 370/332, 328, 235
See application file for complete search history.

(56) References Cited

U.S. PATENT DOCUMENTS

| | | | |
|---|---|---|---|
| 5,825,762 A | | 10/1998 | Kamin, Jr. et al. |
| 6,128,470 A | * | 10/2000 | Naidu et al. ................. 455/16 |
| 7,069,037 B2 | | 6/2006 | Lott et al. |
| 7,206,598 B2 | | 4/2007 | Attar et al. |
| 7,308,280 B2 | * | 12/2007 | Huh et al. .................. 455/522 |
| 7,317,711 B2 | * | 1/2008 | Bae et al. .................. 370/335 |
| 7,609,635 B2 | * | 10/2009 | Bae et al. .................. 370/235 |
| 2004/0100921 A1 | | 5/2004 | Khan |
| 2004/0120287 A1 | * | 6/2004 | Lott et al. .................. 370/332 |
| 2004/0162101 A1 | | 8/2004 | Kim et al. |
| 2004/0203968 A1 | | 10/2004 | Gopalakrishnan et al. |
| 2006/0063545 A1 | | 3/2006 | Yang et al. |
| 2006/0079267 A1 | | 4/2006 | Kim et al. |
| 2007/0049314 A1 | * | 3/2007 | Balachandran et al. ...... 455/518 |
| 2007/0270100 A1 | * | 11/2007 | Agrawal et al. ............ 455/67.11 |
| 2009/0059821 A1 | * | 3/2009 | Wu et al. .................. 370/286 |

FOREIGN PATENT DOCUMENTS

WO 2006104772 A1 10/2006

OTHER PUBLICATIONS 3G, 3rd Generation Partnership Project 2, "3GPP2", cdma2000 High Rate Packet Data Air Interface Specification, 3GPP2 C.S0024-A, Version 3.0, Sep. 2006.
Heinz A. Miranda, Robert Sauber, Motorola Technical Developments Information Sheet for Defensive Publication, Method to Maximize Reverse Link Performance under Faulty Radiant System Conditions, Sep. 14, 2006, downloaded from the World Wide Web at http://www.priorartdatabase.com/IPCOM/000143236/.
Qualcomm, CDMA2000 1xEVolution (EV-DO): 1S-856, Aug. 2004.
Emerging Wireless Technologies, QCHAT—The Future of Push-to-Talk Communications, May 2002.
Phone Scoop, definition of 1xEV-DO, downloaded from the World Wide Web at http://phonescoop.com/glossary/term.php?gid=151, on Apr. 22, 2008.

* cited by examiner

Primary Examiner — Derrick W Ferris
Assistant Examiner — Maharishi Khirodhar (57) ABSTRACT

A method and system for increasing throughput of a wireless communications network and for reducing a reverse noise rise experienced by the wireless network are described. An access network and/or one or more access terminals monitor an activity level of reverse-link communications occurring between the access network and the access terminal(s). The access network and/or the access terminal(s) make a determination of whether an activity level of the reverse-link communications exceeds a threshold. If the threshold is exceeded, the access network and the access terminal(s) each operate in states such that the access network does not measure a noise floor and the access terminal(s) transmit communications to the access network. If the threshold is not exceeded, the access network and the access terminal(s) each operate in states such that the access network measures the noise floor and the access terminal(s) do not transmit communications to the access network.

20 Claims, 7 Drawing Sheets

SYSTEM AND METHOD FOR REDUCING REVERSE NOISE RISE IN WIRELESS COMMUNICATIONS

BACKGROUND

The use of wireless networks to carry out voice and/or data communications has been steadily increasing over the past several years. Throughout these years, wireless service providers have implemented various wireless networks and/or improvements to the wireless networks. These wireless networks and/or improvements have allowed the service providers to maintain subscribers and/or to attract new subscribers.

A typical wireless network includes multiple base stations that transmit radio frequency (RF) signals from an antenna so as to form a cell and/or a cell sector. The base stations may be referred to as access networks. One or more mobile stations that are located within the cell and/or cell sector may receive a portion of the RF signals transmitted from a base station. These mobile station(s), which may be referred to as access terminal(s), may transmit RF signals that can be received by one or more of the access networks. The transmission of RF signals from an access network to an access terminal occurs in a forward-link direction, whereas transmission of RF signals from an access terminal to an access network occurs in a reverse-link direction.

The RF signals transmitted from an access network and the RF signals transmitted from an access terminal may be arranged according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO) or 1xEV-DO, perhaps in conformance with one or more industry specifications such as IS-856, Release 0 and IS-856, Revision A. Other wireless protocols may be used as well, such as Global System for Mobile Communications (GSM), Time Division Multiple Access (TDMA), and/or any others.

An access network that receives RF signals from a plurality of registered access terminals (e.g., access terminals that are registered with an access network so as to be served by the access network), may also receive RF signals from a plurality of other devices (e.g., unregistered access terminals (e.g., access terminals that are not registered with the access network)). The RF signals received from the plurality of other devices may contribute to a noise floor that is experienced by the access network. The RF signals received from the registered access terminals may contribute to a reverse noise rise (RNR) that is experienced by the access network.

OVERVIEW

Exemplary methods and systems for increasing throughput of a wireless network and for reducing RNR are described herein. In one respect, an exemplary method, carried out at an access network, includes (i) at the access network, during a monitoring period, monitoring an activity level of reverse-link communications occurring between the access network and one or more access terminals, and (ii) at the access network, making a determination of whether the monitored activity level of reverse-link communications exceeds a threshold. If the determination is that the monitored activity level of reverse-link communications does not exceed the threshold, then, during an adjustment period that occurs after the monitoring period, responsively operating the access network in a first state, wherein operating the access network in the first state includes the access network (i) measuring a noise floor, and (ii) not receiving any communications from the one or more access terminals. Otherwise, if the determination is that the monitored activity level of reverse-link communications exceeds the threshold, then, during the adjustment period, responsively operating the access network in a second state, wherein operating the access network in the second state includes the access network (i) receiving communications from at least one of the one or more access terminals, and (ii) not measuring the noise floor.

In another respect, an exemplary method, carried out a given access terminal, includes (i) at the given access terminal, during a monitoring period, monitoring an activity level of reverse-link communications occurring between an access network and one or more access terminals, the one or more access terminals including the given access terminal, and (ii) at the given access terminal, making a determination of whether the activity level of reverse-link communications exceeds a threshold. If the determination is that the activity level of reverse-link communications does not exceed the threshold, then, during an adjustment period that occurs after the monitoring period, responsively operating the given access terminal in a first state, wherein, while the given access terminal operates in the first state, the given access terminal does not transmit communications to the access network and the access network measures a noise floor. Otherwise, if the determination is that the activity level of reverse-link communications exceeds the threshold, then, during the adjustment period, responsively operating the given access terminal in a second state, wherein, while the given access terminal operates in the second state, the given access terminal transmits communications to the access network and the access network does not measure the noise floor.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Introduction

Exemplary methods and systems for increasing throughput of a wireless network are described herein. Increasing throughput of the wireless network may cause a reverse noise rise experienced by the wireless network to be reduced. One or more of the exemplary methods may be carried out at an access network and/or at one or more access terminals within the wireless network. An access network and the one or more access terminals may each determine a common monitoring period for monitoring an activity level of reverse-link communications occurring between the access network and the one or more access terminals. The one or more access terminals may be (i) located within a cell and/or cell sector formed by the access network, and (ii) registered with the access network as access terminals authorized to be served by the access network. For purposes of this description, these one or more access terminals will be referred to as "registered access terminal" or "registered access terminals," or more simply "access terminal" or "access terminals."

During the monitoring period and/or upon completion of the monitoring period, the access network and the registered access terminals may each make a determination of whether the monitored activity level of reverse-link communications exceeds a threshold. In one respect, if the access network determines that the monitored activity level of reverse-link communications does not exceed the threshold, then, during a given adjustment period that occurs after the given monitoring period, the access network responsively operates in a state in which the access network measures a noise floor and does not receive any communications from the registered access terminals. For purposes of this description, this state is referred to as the "first access network state." While the access network operates in the first access network state, the access network may not receive any communications from the registered access terminals because each of the registered access terminals has (i) also determined that the monitored activity level of reverse-link communications does not exceed the threshold, and (ii) begun operating in a state in which the access terminal does not transmit reverse-link communications to the access network.

In another respect, if the access network determines that the monitored activity level of reverse-link communications exceeds the threshold, then, during the given adjustment period, the access network responsively operates in a state in which the access network (i) receives communications from at least one of the registered access terminals, and (ii) does not measure the noise floor. For purposes of this description, this state is referred to as the "second access network state." During the second access network state, the access network may receive communications from at least one of the registered access terminals because each of the registered access terminals (i) has also determined that the monitored activity level of reverse-link communications exceeds the threshold, and (ii) is trying to reduce a reverse-noise rise that the access network may be experiencing.

In yet another respect, if a registered access terminal determines that the monitored activity level of reverse-link communications does not exceed the threshold, then, during the given adjustment period, the access terminal responsively operates in a state in which the access terminal does not transmit communications to the access network. For purposes of this description, this state is referred to as the "first access terminal state." While the registered access terminal operates in the first access terminal state, the access network may measure the noise floor.

In still yet another respect, if the registered access terminal determines that the monitored activity level of reverse-link communications exceeds the threshold, then, during the given adjustment period, the access terminal responsively operates in a state in which the access terminal transmits communications to the access network. For purposes of this description, this state is referred to as the "second access terminal state." While the access terminal operates in the second access terminal state, the access network does not measure the noise floor.

The common monitoring period, in which the activity level of reverse-link communications is monitored, may correspond to a portion of forward-link communications transmitted from the access network. In this regard, for example, the access network and/or the registered access terminals may monitor the activity level of reverse-link communications by monitoring reverse activity bits (RABs) that are transmitted from the access network to the registered access terminals. The monitored reverse-link communications may include communications sent over a pilot channel, a data channel, a medium access control channel, and/or an acknowledgment channel, or some other type of reverse-link channel. The monitored reverse-link communications may include reverse-link communications from an access terminal operating in an access channel mode or in a traffic channel mode.

The common monitoring period may occur during a full communication period in which the registered access terminals may transmit reverse-link communications without need to suspend transmission of the reverse-link communications to allow the access network to measure a noise floor. The full communication periods may occur after an adjustment period in which the access network operates in the first access network state or the second access network state, and in which the access terminals operate in the first access terminal state or the second access terminal state.

Measuring the noise floor may be carried out in various ways. For example, measuring the noise floor may include the access network measuring the power of a given frequency band of radio frequency energy that is received at a given base transceiver station (BTS) of the access network. The noise floor may be measured while the registered access terminals are not transmitting reverse-link communications to the access network. The measured noise floor may, for example, be measured in watts and converted to a measurement in decibels relative to a milliwatt (dBm). Other examples of measuring the noise floor are also possible.

2. Exemplary Wireless Network

Figure 1:
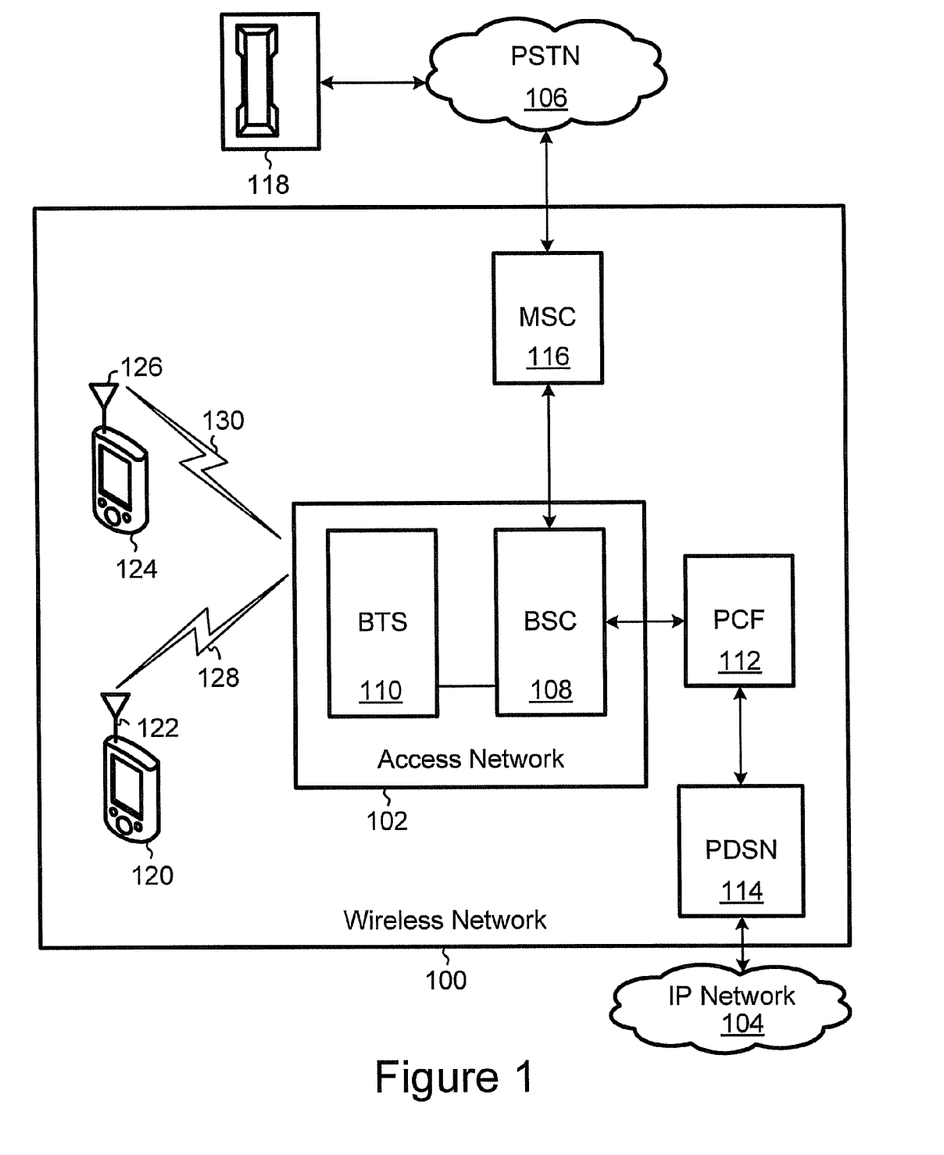
FIG. 1 is a block diagram of a wireless network in which an exemplary embodiment may be implemented.

FIG. 1 depicts an exemplary wireless network 100 in which an exemplary method may be carried out and in which an exemplary system may operate. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software. Further still, one or more of the functions described herein being performed via the execution of computer-readable program instructions may be carried out via execution of program logic other than interrupt-based program instructions, such as non-interrupt based program logic that is executable in a field programmable gate array (FPGA).

As illustrated in FIG. 1, wireless network 100 includes an access network 102 (e.g., a radio access network), a packet control function (PCF) 112, a mobile switching center (MSC)

(e.g., a switch) 116, a packet data serving node (PDSN) 114, an access terminal 120 including an antenna 122, and an access terminal 124 including an antenna 126. Wireless network 100 interfaces and/or connects to an Internet Protocol (IP) network 104 via PDSN 114 and to a public switched telephone network (PSTN) 106 via MSC 116. PSTN 106 may be connected to one or more landline telephones, such as landline telephone 118, and to one or more other devices, such a desktop computer. IP network 104 may includes a plurality of devices, such as a network server, a session initiation protocol (SIP) telephone, and one or more other devices. The devices connected to PSTN 106 and/or one or more of the devices of IP network 104 may engage in a communication session (e.g., a phone call or a data session) with access terminals 120, 124.

Access network 102 includes a base station controller (BSC) 108 and a BTS 110. BTS 110 radiates RF energy so as to form the cell or the cell sector in which the registered access terminals (e.g., access terminals 120, 124) are located. The radiated RF energy may be arranged as forward-link channels of air interfaces 128, 130. The forward-link channels of air interfaces 128, 130 may be arranged according to a wireless protocol such as CDMA, 1xRTT, 1x-EvDO, or some other wireless protocol. BTS 110 may include one or more antennas and one or more power amplifiers to radiate the RF energy. The one or more antennas may also be used to received RF energy (e.g., RF signals) transmitted from access terminals 120, 124. One of ordinary skill in the art will understand that access network 102 may include a plurality of BTSs that connect to and are controlled by BSC 108, and/or a plurality of BSCs that each connect to and control at least one BTS.

PCF 112 is an interface between BSC 108 and PDSN 114. PCF 112 performs various functions such as managing Layer 2 connections to PDSN 114, and buffering data received from PDSN 114 until radio resources of access network 102 become available. BSC 108 may comprise PCF 112. PDSN 114 performs various functions such as (i) managing point-to-point protocol (PPP) data sessions established by access terminal 120, and (ii) maintaining routing tables for determining routes within IP network 104.

Access terminals 120, 124 may each be arranged as any of a variety of wireless communication devices, such as a cellular phone, a personal digital assistant, (PDA), a laptop computer with a wireless network interface card, or another type of wireless communication device. Access terminals 120, 124 can execute various sets of program logic to carry out communications via air interfaces 128, 130, respectively. For example, access terminals 120, 124 can execute a respective first set of program logic so as to carry out voice communications. The voice communications may occur via a normal cellular call (e.g., a call using a full-duplex scheme in which two separate channels (a forward-link channel and a reverse-link channel) are used for the call). Alternatively, the voice communications may occur via a push-to-talk call (e.g., a call using a half-duplex scheme in which one channel is used for the call). As another example, access terminals 120, 124 can execute a respective second set of program logic so as to carry out data communications. The second set of program logic may include or interface to program logic that allows a user to browse the World Wide Web, send text messages, and/or stream media files from a device in IP network 104. For purposes of this description, the first sets of program logic will be referred to as "voice applications" and the second sets of program logic will be referred to as "data applications."

3. Exemplary Communication Streams

Figure 2:
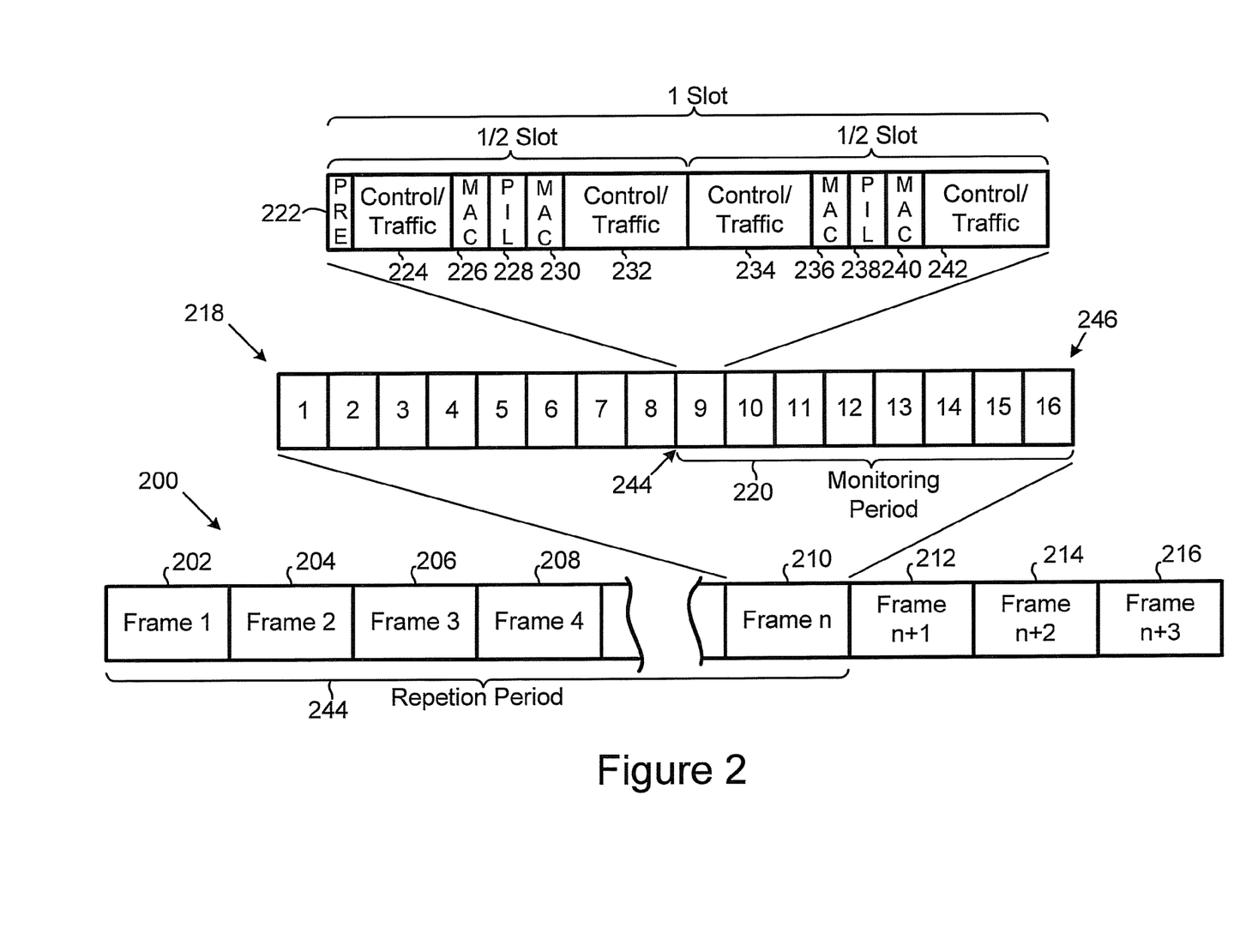
FIG. 2 depicts an exemplary forward-link communication stream.

Next, FIG. 2 depicts an exemplary forward-link communication stream 200 that may be transmitted, for example, by BTS 110, in accordance with the 1xEV-DO wireless protocol. One of ordinary skill in the art will understand that communication streams according to other wireless protocols may also be used in carrying out an exemplary method and used by an exemplary system.

Communication stream 200 includes a plurality of frames 202, 204, 206, 208, 210, 212, 214, 216. One of ordinary skill in the art will understand that communication stream 200 may include a plurality of frames prior to frame 202 and a plurality of frames after frame 216. Each of the frames 202, 204, 206, 208, 210, 212, 214, 216 may comprise a plurality of slots, such as a plurality of slots 218 within frame 210. Typically, each frame includes a common quantity of slots (e.g., 16 slots) and each slot has a common duration (e.g., 1.667 ms). Alternatively, one or more frames may include a number of slots greater than or less than 16 slots and/or one or more slots may have a duration that is greater than or less than 1.667 ms.

FIG. 2 depicts details of slot 9 of frame 210. Each of the other slots of slots 218 may be arranged similar to slot 9. As depicted in FIG. 2, slot 9 includes a preamble channel 222, control/traffic channels 224, 232, 234, 242, media access channels (MACs) 226, 230, 236, 240, and pilot channels 228, 238. An exemplary monitoring period 220 comprises the final slots (e.g., the final 8 slots) of a given frame (e.g., frame 210). Monitoring period 220 may be defined, at least in part, by a monitoring period start point 244 and a monitoring period end point 246. End point 246 occurs after start point 244. As an example, a frame that include a monitoring period may occur every "n" number of frames, where "n" could be 4,095 or some other number. The value of "n" may be selected such that a time it takes for "n" frames to be transmitted in a forward-link direction is considerably larger (e.g., approximately 1,000 times larger) than the given adjustment period in which the access network 102 operates in the first access network state or the second access network state.

MACs 226, 230, 236, 240 may carry and/or include a variety of data. As an example, MACs 226, 230, 236, 240 may each carry and/or include a reverse activity bit (RAB) that indicates a level of activity in the reverse-link direction for a given cell or cell sector of access network 102. For any given slot, such as slot 9 of frame 210, the RABs within the MACs of that slot are the same value. As an example, each of the RABs of the given slot may be set to a value of 1 so as to indicate that the reverse-link activity at access network 102 is high; otherwise, the RABs of the given slot may be set to a value of 0 so as to indicate that the reverse-link activity level at access network 102 is not high. A given access terminal (e.g., access terminal 120) may monitor one or more RABs that are received at the given access terminal so as to monitor an activity level of the reverse-link communications occurring between access terminal 102 and the registered access terminals (including the given access terminal). Similarly, access network 102 can monitor one or more RABs that it transmits so as to monitor the activity level of reverse-link communications occurring between access terminal 102 and the registered access terminals.

Figure 3:
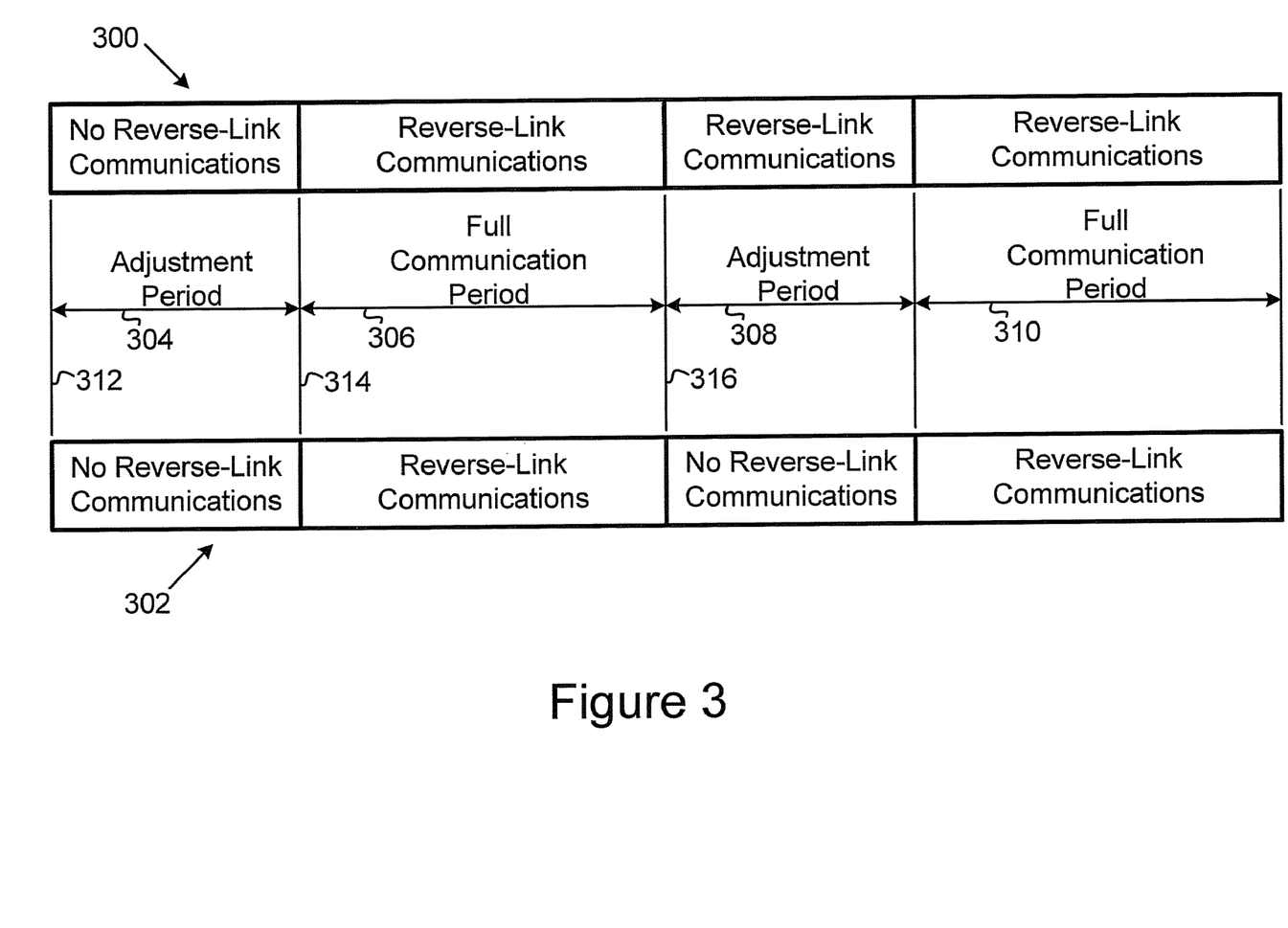
FIG. 3 depicts exemplary reverse-link communication streams.

Next, FIG. 3 depicts exemplary reverse-link communication streams 300, 302. For purposes of this description, communication stream 300 comprises a communication stream that is transmitted from access terminal 120 to access network 102 via air interface 128 while access terminal 120 is executing a data application, and communication stream 302 comprises a communication stream that is transmitted from access terminal 124 to access network 102 via air interface 130 while access terminal 124 is executing a voice application.

FIG. 3 depicts four periods associated with communication streams 300, 302, namely adjustment periods 304, 308 and full communication periods 306, 310. A person having ordinary skill in the art will understand that, in accordance with the exemplary methods and systems, a plurality of periods, similar to the periods shown in FIG. 3, may occur prior to adjustment period 304 and another plurality of periods, similar to the periods shown in FIG. 3, may occur after full communication period 310. Additionally, the four periods are not drawn to a common scale. In this regard, for example, full communication periods 306, 310 may each extend for a time duration that is at least 1,000 times longer than a time duration of adjustment periods 304, 308.

Adjustment periods 304, 308 are time periods during which (i) access network 102 operates in either the first access network state or the second access network state, and (ii) access terminals 120, 124, respectively, operate in either the first access terminal state or the second access network state. Adjustment period 304 may be defined, at least in part, by an adjustment period start point 312 and an adjustment point end point 314. End point 314 occurs after start point 312. Adjustment period start point 312 occurs at or at substantially the same time as monitoring end point 246. In this regard, substantially the same time refers to a time equal to or less than the duration of half of a slot or a slot of a forward-link communications frame. Alternatively, access network 102 may transmit at least one time slot of data after the monitoring end point 246 and prior to adjustment period start point 312.

Full communication periods 306, 310 are time periods during which (i) access network 102 operates in another access network state (e.g., a state other than the first access network state or the second access network state), and (ii) access terminals 120, 124 operate in another access terminal state (e.g., a state other than the first access terminal state or the second access network state). Full communication period 306 may be defined, at least in part, by (i) a full communication period start point that occurs at or substantially at the same time as end point 314, and (ii) an adjustment point end point 316 that occurs after the full communication period start point that occurs at or substantially at the same time as end point 314.

The time periods during which an access network operates in the first access network state or the second access network state, such as adjustment periods 304, 308, are typically the same length of time or substantially the same length of time. For example, adjustment periods 304, 308 may each extend for a length of time based on a predetermined quantity of reverse-link frames, such as one, two, three or four reverse-link frames. For instance, adjustment periods 304, 308 may each extend for 106.68 ms (i.e., the time period of four 26.67 ms 1xEV-DO reverse-link frames).

Similarly, the time periods in which an access network operates in the other access network state, such as full communication periods 306, 310, are typically the same length of time or substantially the same length of time. As an example, full communication periods 306, 310 may each extend for a length of time based on a predetermined quantity of reverse-link frames, such as 4,095 reverse-link frames or some other quantity of reverse-link frames.

In one respect, adjustment periods 304, 308 begin upon completion of a respective monitoring period. As an example, adjustment period 304 may begin upon completion of monitoring period 220 and adjustment period 308 may begin upon completion of the next monitoring period subsequent to monitoring period 220. In another respect, adjustment periods 304, 308 begin within a given amount of time after completion of the respective monitoring period. The given amount of time may be associated with an amount of time it takes for a processor to determine that the respective monitoring period is completed. As an example, the given amount of time could be a time that is greater than 0 seconds and less than 500 milliseconds. Other examples of the given amount of time are also possible.

As shown in FIG. 3, during adjustment period 304, no reverse-link communications occur via communication streams 300, 302. In this way, during adjustment period 304, access network 102 may measure a noise floor that does not include communications from access terminals 120, 124. Similarly, any other registered access terminals does not transmit reverse-link communications during adjustment period 304.

On the other hand, during adjustment period 308, no reverse-link communications occur via communications stream 302, but reverse-link communications may occur via communication stream 300. In this way, access terminal 120, which is executing a data application, may transmit reverse-link communications for the data application during adjustment period 308 so as to improve the throughput of wireless network 100 and to reduce any RNR that is being experienced by access network 102. Similarly, any other registered access terminal that is executing a data application may transmit reverse-link communications for the data application during adjustment period 308 and any other registered access terminal that executing a voice application does not transmit reverse-link communications during adjustment period 308.

4. Exemplary Access Network

Figure 4:
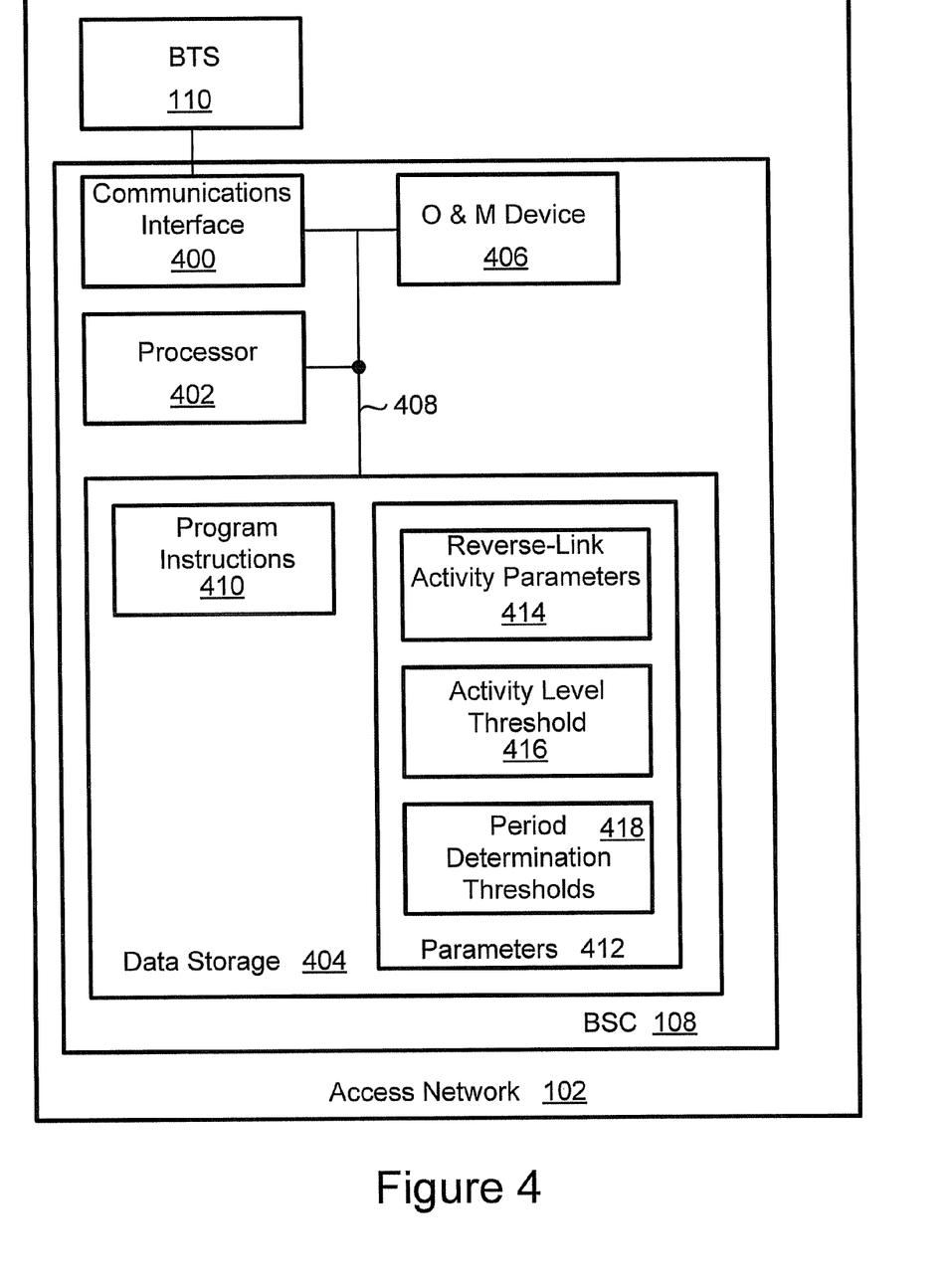
FIG. 4 is a block diagram of an exemplary access network.

Next, FIG. 4 depicts additional details of access network 102. As illustrated in FIG. 4, access network 102, (and more particularly BSC 108) may include a communications interface 400, a processor 402, data storage, 404, and an operations and maintenance (O&M) device 406, all of which may be linked together via a system bus, network, or other connection mechanism 408.

Communications interface 400, which may connect to and/or include BTS 100, is operable to transmit forward-link communications to one or more registered access terminals, such as access terminals 120, 124, and to receive reverse-link communications transmitted from the one or more access terminals. The forward-link communications may be arranged as communication stream 200, and in particular, may include RABs. The access network and the one or more access terminals may use the RABs to monitor an activity level of reverse-link communications occurring between access network 102 and the one or more access terminals. The reverse-link communications may be arranged as communications steams 300, 302.

Processor 402 may comprise one or more general purpose processors (e.g., INTEL microprocessors) and/or one or more special purpose processors (e.g., digital signal processors). Processor 402 may execute computer-readable program instructions stored in data storage 404.

Data storage 404 comprises a computer-readable storage medium readable by processor 402. The computer-readable storage medium may comprise volatile and/or non-volatile storage components, such as optical, magnetic, organic or other memory or disc storage, which can be integrated in whole or in part with processor 402.

Data storage 404 may contain various types of data. For example, data storage 404 may contain a plurality of data parameters 412. Parameters 412 may include reverse-link activity parameters 414 that indicate the activity level of reverse-link communications occurring between access network 102 and the registered access terminals. For instance, parameters 414 may include data that indicates the values of the RABs received during a most-recent monitoring period (e.g., monitoring period 220) or during the most-recent monitoring periods.

Parameters 412 may include an activity level threshold 416 for use in determining whether the monitored activity level is at a level such that access network 102 should operate, during a given adjustment period, in the first access network state or the second access network state. As an example, activity level threshold 416 may indicate a percentage, such as 75%, 80%, 90%, 100%, or some other percentage. As another example, activity level 416 may indicate a quantity of RABs that indicate a high activity level of reverse-link communications, such as 6 RABs, 7 RABs, 8 RABs, or some other quantity of RABs. In this latter example, the number of RABs received during the monitoring period may be 8 RABs.

Parameters 412 may also include period determination thresholds 418 for use in determining a respective duration for each monitoring period, adjustment period, and full communication period. Period determination thresholds 418 may indicate, for example, a number of slots or frames of a given monitoring period, adjustment period, or full communication period.

Program instructions 410 may include a variety of program instructions, such as program instructions that cause access network 102 (or more particularly, processor 402) to control one or more BTSs, such as BTS 110. As another example, program instructions 410 may include program instructions that cause access network 102 (or more particularly, processor 402) to (i) register un-registered access terminals as registered access terminal, (ii) maintain a list of the registered access terminals, and (iii) monitor an activity level of reverse-link communications occurring between access network 102 and the registered access terminals.

As another example, program instructions 410 may include program instructions that cause access network 102 (or more particularly, communications interface 400) to transmit, to the registered access terminals, data (e.g., RABs) that provides an indication of the activity level of reverse-link communications occurring between access terminal 102 and the access terminals. The indicated activity level may, for example, indicate a high activity level of reverse-link communications or a low activity level of reverse-link communications. The communications interface 400 may, for example, transmit the data (e.g., the RABs) once per frame or once per slot of a monitoring period, as well as during other periods not defined as a monitoring period, or more frequently than once a frame or once a slot.

As another example, program instructions 410 may include program instructions that cause access network 102 (or more particularly, processor 402) to monitor the activity level of reverse-link communications occurring between access network 102 and the registered access terminals. Access network 102 may monitor the activity level during monitoring period 220 and any other common monitoring periods defined by access network 102 and the access terminals. Access network 102 may monitor the activity level by monitoring the RABs that are transmitted during the monitoring period. Alternatively, access network 102 may monitor the activity level by monitoring determinations made at access network 102 as to whether the RABs sent during the monitoring period 220 should be set to a value that indicates a high activity level of reverse-link communications (e.g., a value of 1) or to another value (e.g., a value that indicates a low activity level of reverse-link communications (e.g., a value of 0)).

As another example, program instructions 410 may include instructions that cause access network (or more particularly, processor 402) to make a determination of whether the monitored activity level of reverse-link communications exceeds activity level threshold 416. During a common monitoring period (e.g., monitoring period 220) or subsequent to the common monitoring period, access network 102 and the registered access terminals may each make the same determination as to whether the activity level of reverse-link communications exceeds the threshold.

As yet another example, program instructions 410 may include instructions that cause access network 102 (or more particularly, processor 402) to operate in the first access network state during a given adjustment period that occurs after the given monitoring period and prior to a subsequent monitoring period. Processor 402 may execute these program instructions in response to determining that the monitored activity level of reverse-link communications does not exceed the activity level threshold 416. While access network 102 operates in the first access network state, access network 102 may measure the noise floor. Additionally, while access network 102 operates in the first access network state, communications interface 400 may not receive any reverse-link communications from the registered access terminals.

As still yet another example, program instructions 410 may includes instructions that cause access network 102 (or more particularly, processor 402) to operate in the second access network state during the given adjustment period. Processor 402 may execute these program instructions in response to determining that the monitored activity level of reverse-link communications exceeds the activity level threshold 416. While access network 102 operates in the second access network state, access network 102 does not measure the noise floor. Additionally, while access network 102 operates in the second access network state, during the given adjustment period, access network 102 may receive reverse-link communications from the registered access terminals.

O&M device 406 provides means for a wireless service provider to operate and/or maintain access network 102. Operating and/or maintaining access network 102 may include performing any of a variety of functions, such as modifying activity level threshold 416 and/or one or more of period determination threshold 418. O&M device 406 may include a user interface, including a keyboard to enter data for modifying activity level threshold 416 and/or one or more of period determination threshold 418. O&M device 406 may also include a display for presenting a graphical user interface to guide a user in entering data to modify threshold 416 and/or thresholds 418. As an example, O&M device 406 may be used to modify a value of period determination threshold 418 that indicates how many slots are contained in monitoring period 220, thus making the time duration of monitoring period configurable by a wireless service provider. Other exemplary functions carried out in operating and/or maintaining access network 102 are also possible.

5. Exemplary Access Terminal

Figure 5:
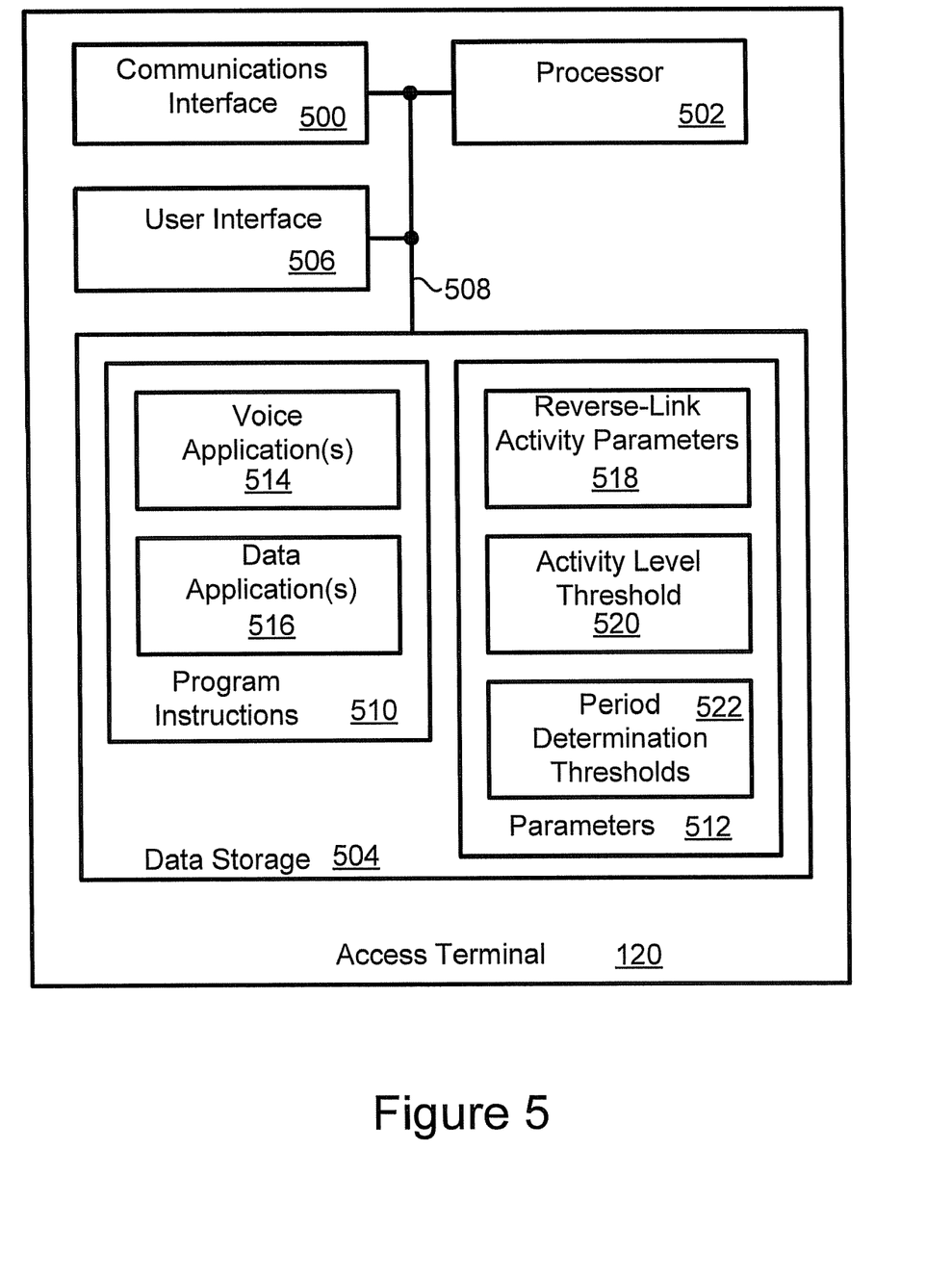
FIG. 5 is a block diagram of an exemplary access terminal.

Next, FIG. 5 depicts details of access terminal 120. As illustrated in FIG. 5, access terminal 120 includes a communications interface 500, a processor 502, data storage 504, and a user interface 506, all of which may all of which may be linked together via a system bus, network, or other connection mechanism 508. Access terminal 124, as well as one or more other access terminals, may be configured as access terminal 120.

Communications interface 500 is operable to receive forward-link communications from access network 102 and to transmit reverse-link communications to access network 102. The forward-link communications may be arranged as communication stream 200, and in particular, may include RABs for use in monitoring an activity level of reverse-link communications occurring between access network 102 and the registered access terminals. The reverse-link communications may be arranged as communications steams 300, 302. One or more of these forward-link and reverse-link communications may be carried out as a result of processor 502 executing a voice application 514 and/or a data application 516.

Communications interface 500 may be arranged in various configurations. As an example, communications interface 500 may be arranged as a transceiver including a chipset and an antenna for transmitting reverse-link communication stream 300 and/or communication stream 302. An exemplary chipset that facilitates communication of reverse-link communication steams according to the 1xEV-DO wireless protocol is the MSM6800™ chipset manufactured by Qualcomm Incorporated of San Diego, Calif. Other exemplary arrangements of communications interface 500 are also possible.

Processor 502 may comprise one or more general purpose processors (e.g., INTEL microprocessors) and/or one or more special purpose processors (e.g., digital signal processors). Processor 502 may execute computer-readable program instructions 510 that are contained in data storage 504.

Data storage 504 comprises a computer-readable storage medium readable by processor 502. The computer-readable storage medium may comprise volatile and/or non-volatile storage components, such as optical, magnetic, organic or other memory or disc storage, which can be integrated in whole or in part with processor 502.

Data storage 504 may contain various types of data. For example, data storage 504 may contain a plurality of data parameters 512. Parameters 512 may include reverse-link activity parameters 518 that indicate the activity level of reverse-link communications occurring between access network 102 and the registered access terminals. For instance, parameters 518 may include data that indicates the values of the RABs received during a most-recent monitoring period (e.g., monitoring period 220) or the most-recent monitoring periods. Parameters 518 may be identical or substantially identical to reverse-link activity parameters 414.

Parameters 512 may include an activity level threshold 520 for use in determining whether the monitored activity level is at a level such that access terminal 120 should operate, during a given adjustment period, in the first access terminal state or the second access terminal state. As an example, activity level threshold 520 may indicate a percentage, such as 75%, 80%, 90%, 100%, or some other percentage. As another example, activity level 520 may indicate a quantity of RABs that indicate a high activity level of reverse-link communications, such as 6 RABs, 7 RABs, 8 RABs, or some other quantity of RABs. In this latter example, the number of RABs received during the monitoring period may be 8 RABs. Access network 102 may communicate an activity level threshold to access terminal 120, and access terminal 120 may modify activity level threshold 520 so that activity level threshold 520 is identical to activity level threshold 416.

Parameters 512 may also include period determination thresholds 522 for use in determining a respective duration for each monitoring period, adjustment period, and full communication period. Period determination thresholds 522 may indicate, for example, a number of slots or frames of a given monitoring period, adjustment period, or full communication period. Period determination thresholds 522 may be identical or substantially identical to period determination thresholds 418.

Program instructions 510 may include a variety of program instructions, such as voice application program instructions 514 that cause processor 502 to execute one or more voice applications and data application program instructions 516 that cause processor 502 to execute one or more data applications. An executed voice application may comprise a push-to-talk application, a Voice over Internet Protocol (VoIP) application, or some other voice application. An executed data application (e.g., a best-effort application) may comprise a web browsing application, a text messaging application, an e-mail application, a media streaming application, or some other data application.

As another example, program instructions 510 may include instructions that (i) cause processor 502 to, during a given monitoring period (e.g., monitoring period 220), monitor an activity level of reverse-link communications occurring between access network 102 and the registered access terminals, (ii) cause data storage 504 to store reverse-link activity parameters 518 for the given monitoring period, and (iii) cause processor 502 to make a determination of whether the monitored activity level of reverse-link communications exceeds activity level threshold 520.

As yet another example, program instructions 510 may includes instructions that cause processor 502 (or more generally, access terminal 120) to operate in the first access terminal state during a given adjustment period that occurs after the given monitoring period and prior to a subsequent monitoring period. Processor 502 may execute these program instructions in response to determining that the monitored activity level of reverse-link communications does not exceed activity level threshold 520. While processor 502 operates in the first access terminal state, communications interface 500 does not transmit reverse-link communications to access network 102. Additionally, while processor 502 operates in the first access terminal state, during at least a portion of the given adjustment period, access network 102 may measure the noise floor.

As still yet another example, program instructions 510 may includes instructions that cause processor 502 (or more generally, access terminal 120) to operate in the second access terminal state during the given adjustment period. Processor 502 may execute these program instructions in response to determining that the monitored activity level of reverse-link communications exceeds activity level threshold 520. While processor 502 (or more generally, access terminal 120) operates in the second access terminal state, communications interface 500 may transmit reverse-link communications to access network 102. Additionally, while processor 502 (or more generally, access terminal 120) operates in the second access terminal state, during the given adjustment period, access network 102 may not measure the noise floor.

User interface 506 provides means for a user to interact with access terminal 120. As an example, user interface 506 may include one or more buttons that allow a user to cause processor 502 to execute a given application (e.g., a voice application or a data application) and/or to enter data (e.g., a phone number or a website uniform resource locator (URL)) into access terminal 120. In particular, user interface 506 may include a push-to-talk button operable to initiate a push-to-talk voice application and operable in carrying out a push-to-talk communication session. As another example, user interface 506 may include a display to visually present, to a user, visual information (e.g., text messages, e-mail messages, web pages, and images) that is received from access network 102, and a speaker to play out audible information (e.g., voice communications, audio files, and ringtones) that may be received from access network 102. Other examples of user interface 506 are also possible.

6. Exemplary Operation

Figure 6:
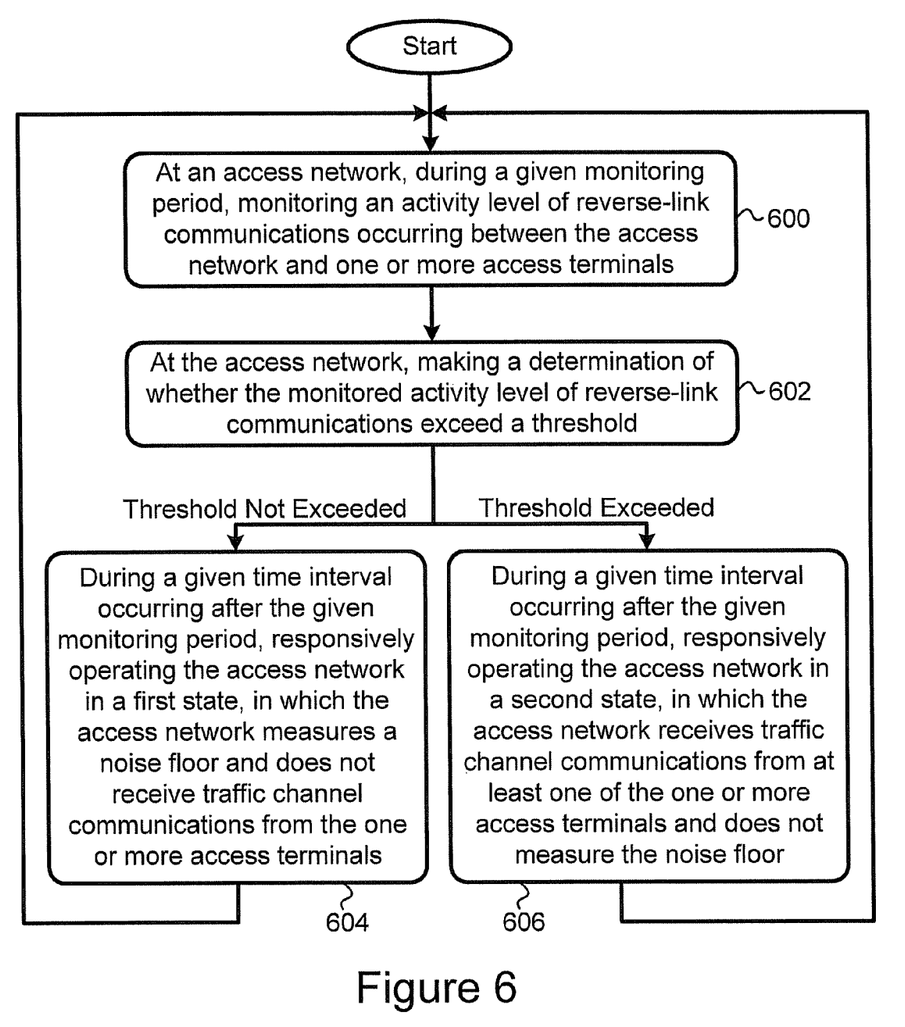
FIG. 6 is a flow chart depicting a set of functions that may be carried out in accordance with an exemplary embodiment of the present invention.

FIG. 6 is a flow chart provided to illustrate a set of functions that may be carried out in accordance with an exemplary embodiment of the present invention.

Block 600 includes, at an access network, during a given monitoring period, monitoring an activity level of reverse-link communications occurring between the access network and one or more access terminals (e.g., the registered access terminals). In general, monitoring of the activity level is carried out by access network 102. In particular, monitoring of the activity level is carried out by processor 202.

Next, block 602 includes, at the access network, making a determination of whether the monitored activity level of reverse-link communications exceeds a threshold, such as activity level threshold 416. As an example, making the determination may include determining whether all of the RABs received during the given monitoring period have a value that indicates a high level of reverse-link activity (e.g., a value of one). In accordance with this example, if all of the RABs received during the given monitoring period have a value of one, then the determination is that monitored activity level of reverse-link communications exceeds the activity level threshold 416; otherwise, if at least one of the RABs received during the given monitoring period has a value of zero, then the determination is that the activity level of reverse-link communications does not exceed the activity level threshold 416.

As another example, making the determination may include (i) calculating a percentage of the received RABs that have a value that indicates a high level of reverse-link activity (e.g., a value of one), and (ii) comparing the calculated percentage to activity level threshold 416. In accordance with this example, if the calculated percentage is greater than or equal to activity level threshold 416 (e.g., a threshold percentage value of 90%), then the determination is that the monitored activity level exceeds activity level threshold 416; otherwise, if the calculated percentage is less than the activity level threshold 416, then the determination is that the monitored activity level does not exceed activity level threshold 416.

Next block 604 includes during a given adjustment period that occurs after the given monitoring period (e.g., adjustment period 304), responsively operating the access network in a first state (e.g., the first access network state). During the given adjustment period, the access network 102 measures the noise floor and does not receive communications from the registered access terminals. The function of block 604 may be carried out if the determination of block 602 is that the monitored activity level of reverse-link communications does not exceed activity level threshold 416.

Next block 606 includes during the given adjustment period occurring after the given monitoring period, responsively operating the access network in a second state. In the second state, the access network receives communications from at least one of the one or more access terminals and does not measure the noise floor. The function of block 606 may be carried out if the determination of block 602 is that the monitored activity level of reverse-link communications exceeds activity level threshold 416.

After occurrence of the given adjustment period, the functions of FIG. 6 may be repeated. For example, during another monitoring period, access network 102 can monitor the activity level of reverse-link communications occurring during the other monitoring period. During the other monitoring period or upon completion of the other monitoring period, access network 102 can make another determination as to whether another activity level of the monitored reverse link communications exceeds the activity level threshold 416.

If the determination is that the other activity level does not exceed the activity level threshold 416, then access network 102 responsively operates in the first access network state. A corresponding and respective determination made at each registered access terminal may also indicate that the other activity level does not exceed the activity level threshold 520 and each registered access terminal may, during the other adjustment period, responsively operate in the first access terminal state.

On the other hand, if the determination is that the other activity level exceeds the activity level threshold 416, then access network 102 responsively operates in the second access network state. A corresponding and respective determination made at each registered access terminal may also indicate that the other activity level exceeds activity level threshold 520 and each registered access terminal may, during the other adjustment period, responsively operate in the second access terminal state.

Figure 7:
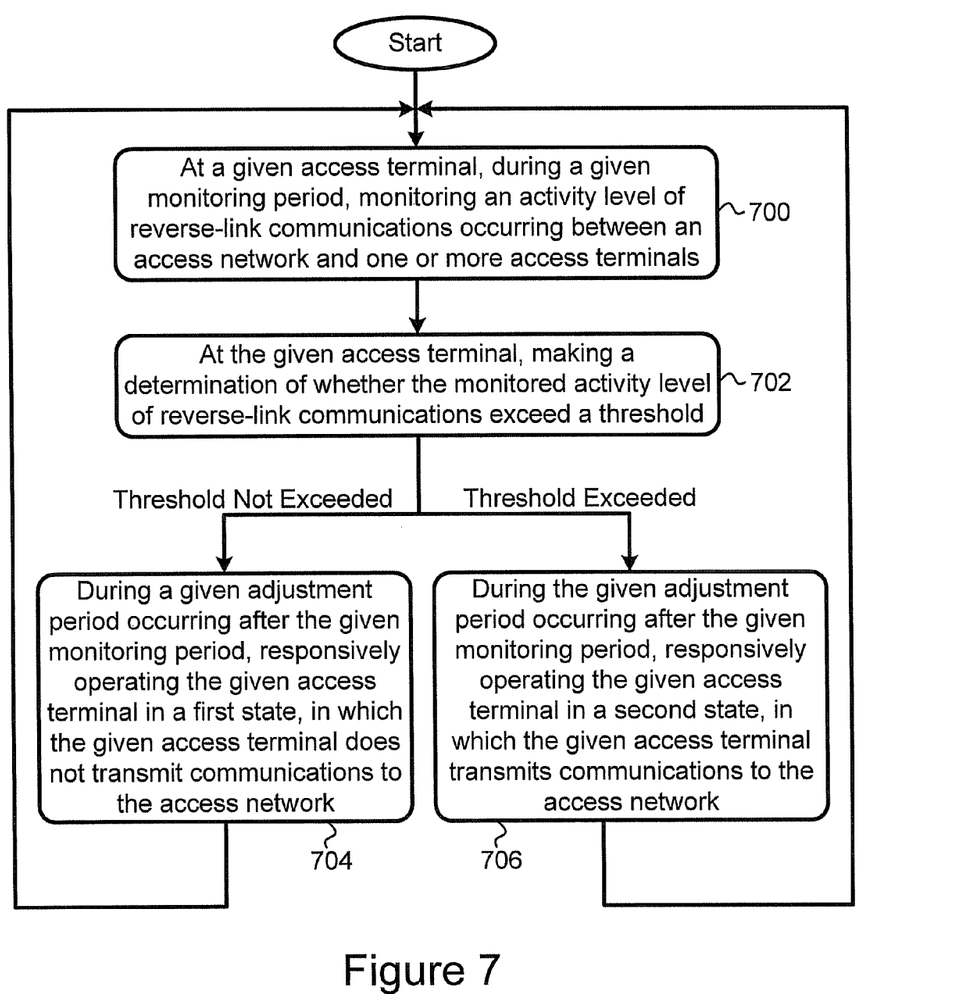
FIG. 7 is a flow chart depicting another set of functions that may be carried out in accordance with an exemplary embodiment of the present invention.

Next, FIG. 7 is a flow chart provided to illustrate another set of functions that may be carried out in accordance with an exemplary embodiment of the present invention.

Block 700 includes, at a given access terminal (e.g., access terminal 120), during a given monitoring period (e.g., monitoring period 220), monitoring an activity level of reverse-link communications occurring between access network 102 and one or more access terminals, The one or more access terminals includes the given access terminal. During the given monitoring period, the given access terminal may operate a voice application 514 and/or a data application 516.

Additionally, the given access terminal may receive one or more RABs that are sent to the given access terminal from the access network 102 via an air interface. Monitoring the activity level may include monitoring the RAB(s) that are received during the given monitoring period. Monitoring the RABs may include storing, within reverse-link activity data 518, data that represents the RAB(s) that are received during the given monitoring period.

Next, block 702 includes, at the given access terminal, making a determination of whether the activity level of reverse-link communications exceeds a threshold, such as activity level threshold 520. While making the determination, the given access terminal may continue to operate the voice application 514 and/or the data application 516 that is/are operating during the given monitoring period.

As an example, making the determination may include determining whether all of the RABs received during the given monitoring period have a value that indicates a high level of reverse-link activity (e.g., a value of one). In accordance with this example, if all of the RABs received during the first monitoring period have a value of one, then the determination is that monitored activity level of reverse-link communications exceeds the activity level threshold 520; otherwise, if at least one of the RABs received during the given monitoring period has a value of zero, then the determination is that the activity level of reverse-link communications does not exceed the activity level threshold 520.

As another example, making the determination may include (i) calculating a percentage of the received RABs that have a value that indicates a high level of reverse-link activity (e.g., a value of one), and (ii) comparing the calculated percentage to activity level threshold 520. In accordance with this example, if the calculated percentage is greater than or equal to activity level threshold 520 (e.g., a threshold percentage value of 90%), then the determination is that the monitored activity level exceeds the threshold; otherwise, if the calculated percentage is less than the activity level threshold 520, then the determination is that the monitored activity level does not exceed the threshold.

Next, block 704 includes during a given adjustment period that occurs after the given monitoring period (e.g., adjustment period 304), responsively operating the given access terminal in a first state (i.e., the first access terminal state). During the given adjustment period, the given access terminal may continue to operate the voice application 514 and/or the data application 516 that is/are operating during the given monitoring period. While operating in first access terminal state, the given access terminal does not transmit communications to access network 102. Additionally, during at least a portion of the time that the given access terminal operates in the first access terminal state, the access network 102 measures the noise floor. The function of block 704 may be carried out if the determination of block 702 is that the activity level of reverse-link communications does not exceed activity level threshold 520.

Next, block 706 includes during the given adjustment period occurring after the given monitoring period, responsively operating the given access terminal in a second state (i.e., the second access terminal state). During the given adjustment period, the given access terminal may continue to operate the voice application 514 and/or the data application 516 that is/are operating during the given monitoring period. While operating in the second access terminal state, the given access terminal transmits communications to access network 102. Additionally, while the given access terminal operates in the second access terminal state, the access network does not measure the noise floor. The function of block 706 may be carried out if the determination of block 702 is that the first activity level of reverse-link communications exceeds activity level threshold 520.

After occurrence of the given adjustment period, the functions of FIG. 7 may be repeated. For example, during another monitoring period, the given access terminal can monitor the activity level of reverse-link communications occurring during the other monitoring period. During the other monitoring period or upon completion of the other monitoring period, the given access terminal can make another determination as to whether another activity level of the monitored reverse link communications exceeds the activity level threshold 520.

If the determination is that the other activity level does not exceed the activity level threshold 520, then the given access terminal responsively operates in the first access terminal state. A corresponding determination made at access terminal 102 may also indicate that the other activity level does not exceed the activity level threshold 416 and access terminal 102 may, during the other adjustment period, responsively operate in the first access network state.

On the other hand, if the determination is that the other activity level exceeds the activity level threshold 520, then the given access terminal responsively operates in the second access terminal state. A corresponding determination made at access terminal 102 may also indicate that the other activity level exceeds the activity level threshold 416 and access terminal 102 may, during the other adjustment period, responsively operate in the second access network state.

7. Conclusion

Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:

1. A method carried out at an access network, the method comprising:
   at the access network, during a given monitoring period, monitoring an activity level of reverse-link communications occurring between the access network and one or more access terminals;
   at the access network, making a determination of whether the monitored activity level of reverse-link communications exceeds a threshold;
   if the determination is that the monitored activity level of reverse-link communications does not exceed the threshold, then, during a given adjustment period that occurs after the given monitoring period, responsively operating the access network in a first state, wherein operating the access network in the first state includes the access network (i) measuring a noise floor, and (ii) not receiving any communications from the one or more access terminals; and
   if the determination is that the monitored activity level of reverse-link communications exceeds the threshold, then, during the given adjustment period, responsively operating the access network in a second state, wherein operating the access network in the second state includes the access network (i) receiving communications from at least one of the one or more access terminals, and (ii) not measuring the noise floor.

2. The method of claim 1, wherein monitoring the activity level of reverse-link communications comprises monitoring one or more reverse activity bits transmitted from the access network to the one or more access terminals.

3. The method of claim 2,
   wherein each reverse activity bit of the one or more reverse activity bits has a value that indicates a high level of reverse-link activity or a value that does not indicate a high level of reverse-link activity,
   wherein, if each reverse activity bit of the one or more reverse activity bits has a value that indicates a high level of reverse-link activity, then the determination is that the monitored activity level exceeds the threshold, and
   wherein, if at least one reverse activity bit of the one or more reverse activity bits has a value that does not indicate a high level of reverse-link activity, then the determination is that the monitored activity level does not exceed the threshold.

4. The method of claim 2,
   wherein each reverse activity bit of the one or more reverse activity bits has a value that indicates a high level of reverse-link activity or a value that does not indicate a high level of reverse-link activity, wherein the threshold comprises a threshold percentage value, the method further comprising:

calculating a percentage of the one or more reverse activity bits that have a value that indicates a high level of reverse-link activity; and comparing the calculated percentage of the one or more reverse activity bits that have a value that indicates a high level of reverse-link activity to the threshold percentage value, wherein, if the calculated percentage is greater than or equal to the threshold percentage value, then the determination is that the monitored activity level exceeds the threshold, and wherein, if the calculated percentage is less than the threshold percentage value, then the determination is that the monitored activity level does not exceed the threshold.

5. The method of claim 1, wherein the one or more access terminals comprise (i) one or more access terminals operating a first type of wireless communication application, and (ii) one or more access terminals operating a second type of wireless communication application, and wherein each of the at least one of the one or more access terminals from which the access network receives communications while the access network operates in the second state comprises one of the access terminals operating the first type of wireless communication application.

6. The method of claim 5, wherein the first type of wireless communication application comprises a best-effort application, and wherein the second type of wireless communication application comprises an application selected from the group consisting of (i) a push-to-talk application, and (ii) a Voice over Internet Protocol (VoIP) application.

7. The method of claim 1, wherein the monitoring period occurs over a configurable amount of time.

8. The method of claim 1, wherein the monitoring period comprises a monitoring period start point and a monitoring period end point, wherein the monitoring period start point occurs prior to the monitoring period end point, wherein the given adjustment period comprises an adjustment period start point and an adjustment period end point, wherein the adjustment period start point occurs prior to the adjustment period end point, and wherein the monitoring period end point and the adjustment period start point occur at substantially the same time.

9. The method of claim 1, wherein the monitoring period comprises a monitoring period start point and a monitoring period end point, wherein the monitoring period start point occurs prior to the monitoring period end point, wherein the given adjustment period comprises an adjustment period start point and an adjustment period end point, wherein the adjustment period start point occurs prior to the adjustment period end point, and wherein after the monitoring period end point and prior to the adjustment period start point, at least one time slot of data is transmitted via the access network.

10. A system comprising:

a communications interface operable to transmit forward-link communications to a given set of one or more access terminals and to receive reverse-link communications from the given set of one or more access terminals;

a processor; and data storage device storing computer-readable program instructions executable by the processor, wherein the program instructions include instructions that cause the processor to (i) during a given monitoring period, monitor an activity level of reverse-link communications occurring between the communications interface and the given set of one or more access terminals, (ii) make a determination of whether the monitored activity level of reverse-link communications exceeds a threshold, (iii) if the determination is that the monitored activity level of reverse-link communications does not exceed the threshold, then, during a given adjustment period that occurs after the given monitoring period, responsively operate in a first state, wherein while the processor operates in the first state, the processor measures a noise floor, and (iv) if the determination is that the monitored activity level of reverse-link communications exceeds the threshold, then, during the given adjustment period, responsively operate in a second state, wherein while the processor operates in the second state, the processor does not measure the noise floor, wherein, while the processor operates in the first state, the communications interface does not receive any reverse-link communications from the given set of one or more access terminals, and wherein, while the processor operates in the second state and during at least a portion of the given adjustment period, the communications interface receives reverse-link communications from the given set of one or more access terminals.

11. The system of claim 10, wherein each access terminal of the given set of one or more access terminals comprises an access terminal that is registered, with the system, as an access terminal authorized to be served by the system.

12. The system of claim 11, wherein, during the given monitoring period, the communications interface transmits one or more reverse activity bits to the given set of one or more access terminals, and wherein the program instructions to monitor the activity level of reverse-link communications comprise instructions to monitor the one or more reverse activity bits transmitted, during the given monitoring period, from the communications interface.

13. The system of claim 12, wherein each reverse activity bit of the one or more reverse activity bits has a value that indicates a high level of reverse-link activity or a value that does not indicate a high level of reverse-link activity, wherein the program instructions to make the determination of whether the monitored activity level of reverse-link communications exceeds a threshold comprise instructions to determine whether each reverse activity bit of the one or more reverse activity bits has a value that indicates a high level of reverse-link activity, wherein, if each reverse activity bit of the one or more reverse activity bits has a value that indicates a high level of reverse-link activity, then the determination is that the monitored activity level exceeds the threshold, and wherein, if at least one reverse activity bit of the one or more reverse activity bits has a value that does not indicate a high level of reverse-link activity, then the determination is that the monitored activity level does not exceed the threshold.

14. The system of claim 12,
wherein each reverse activity bit of the one or more reverse activity bits has a value that indicates a high level of reverse-link activity or a value that does not indicate a high level of reverse-link activity, and
wherein the threshold comprises a threshold percentage value,
wherein the program instructions to make the determination of whether the monitored activity level of reverse-link communications exceeds a threshold comprise instructions to (i) calculate a percentage of the one or more reverse activity bits that have a value that indicates a high level of reverse-link activity, and (ii) compare the calculated percentage of the one or more reverse activity bits that have a value that indicates a high level of reverse-link activity to the threshold percentage value,
wherein, if the calculated percentage is greater than or equal to the threshold percentage value, then the determination is that the monitored activity level exceeds the threshold, and
wherein, if the calculated percentage is less than the threshold percentage value, then the determination is that the monitored activity level does not exceed the threshold.

15. A method carried out at a given access terminal, the method comprising:
at the given access terminal, during a first monitoring period, monitoring a first activity level of reverse-link communications occurring between an access network and one or more access terminals, the one or more access terminals including the given access terminal;
at the given access terminal, making a first determination of whether the first activity level of reverse-link communications exceeds a threshold;
if the first determination is that the first activity level of reverse-link communications does not exceed the threshold, then, during a first adjustment period that occurs after the first monitoring period, responsively operating the given access terminal in a first state, wherein, while the given access terminal operates in the first state, the given access terminal does not transmit communications to the access network and the access network measures a noise floor; and
if the first determination is that the first activity level of reverse-link communications exceeds the threshold, then, during the first adjustment period, responsively operating the given access terminal in a second state, wherein, while the given access terminal operates in the second state, the given access terminal transmits communications to the access network and the access network does not measure the noise floor.

16. The method of claim 15, further comprising:
at the given access terminal, during the monitoring period, receiving one or more reverse activity bits that are transmitted to the given access terminal from the access network,
wherein monitoring the activity level of reverse-link communications comprises monitoring the one or more reverse activity bits.

17. The method of claim 16,
wherein each reverse activity bit of the one or more reverse activity bits has a value that indicates a high level of reverse-link activity or a value that does not indicate a high level of reverse-link activity,
wherein, if each reverse activity bit of the one or more reverse activity bits has a value that indicates a high level of reverse-link activity, then the determination is that the monitored activity level exceeds the threshold, and
wherein, if at least one reverse activity bit of the one or more reverse activity bits has a value that does not indicate a high level of reverse-link activity, then the determination is that the monitored activity level does not exceed the threshold.

18. The method of claim 16,
wherein each reverse activity bit of the one or more reverse activity bits has a value that indicates a high level of reverse-link activity or a value that does not indicate a high level of reverse-link activity, and
wherein the threshold comprises a threshold percentage value,
the method further comprising:
calculating a percentage of the one or more reverse activity bits that have a value that indicates a high level of reverse-link activity; and
comparing the calculated percentage of the one or more reverse activity bits that have a value that indicates a high level of reverse-link activity to the threshold percentage value,
wherein, if the calculated percentage is greater than or equal to the threshold percentage value, then the determination is that the monitored activity level exceeds the threshold, and
wherein, if the calculated percentage is less than the threshold percentage value, then the determination is that the monitored activity level does not exceed the threshold.

19. The method of claim 15,
wherein during the first monitoring period, when making the first determination, and during the first adjustment period, the given access terminal executes a first type of wireless communication application, but does not execute a second type of wireless communication application,
the method further comprising:
at the given access terminal, during a second monitoring period, monitoring a second activity level of reverse-link communications occurring between the given access terminal and the access network;
at the given access terminal, making a second determination of whether the second activity level of reverse-link communications exceeds the threshold;
if the second determination is that the second activity level of reverse-link communications does not exceed the threshold, then, during a second adjustment period that occurs after the second monitoring period, responsively operating the given access terminal in a first state, wherein, while the given access terminal operates in the first state, the given access terminal does not transmit communications to the access network and the access network measures a noise floor; and
if the second determination is that the second activity level of reverse-link communications exceeds the threshold, then, during the second adjustment period, responsively operating the given access terminal in a second state, wherein, while the given access terminal operates in the second state, the given access terminal transmits communications to the access network and the access network does not measure the noise floor.

20. An apparatus comprising:
a communications interface operable to receive forward-link communications from an access network and to transmit reverse-link communications to the access network;
a processor; and
a computer-readable data storage device storing computer-readable program instructions executable by the processor, wherein the program instructions include instructions that (i) cause the processor to, during a given monitoring period, monitor an activity level of reverse-link communications occurring between one or more access terminals and the access network, (ii) cause the processor to make a determination of whether the monitored activity level of reverse-link communications exceeds a threshold, (iii) if the determination is that the monitored activity level of reverse-link communications does not exceed the threshold, then, during a given adjustment period that occurs after the given monitoring period, responsively operate in a first state, wherein while the processor operates in the first state, the communication interface does not transmit reverse-link communications to the access network, and (iv) if the determination is that the monitored activity level of reverse-link communications exceeds the threshold, then, during the given adjustment period, responsively operate in a second state, wherein while the processor operates in the second state, the communications interface transmits reverse-link communications to the access network, wherein, while the processor operates in the first state and during at least a portion of the given adjustment period, the access network measures a noise floor, and wherein, while the processor operates in the second state and during the given adjustment period, the access network does not measure the noise floor.

* * * * *